INVENTOR.
Henry E. Hull

BY Adams, Stevens and Mose

AGENTS.

Oct. 13, 1953    H. E. HULL    2,655,057
SAW FILING MACHINE
Filed Sept. 15, 1949    8 Sheets-Sheet 2

INVENTOR.
Henry E. Hull
BY Adams, Stevens and Mase

AGENTS.

A-A

INVENTOR.
Henry E. Hull

BY Adams, Stevens and Nease

AGENTS.

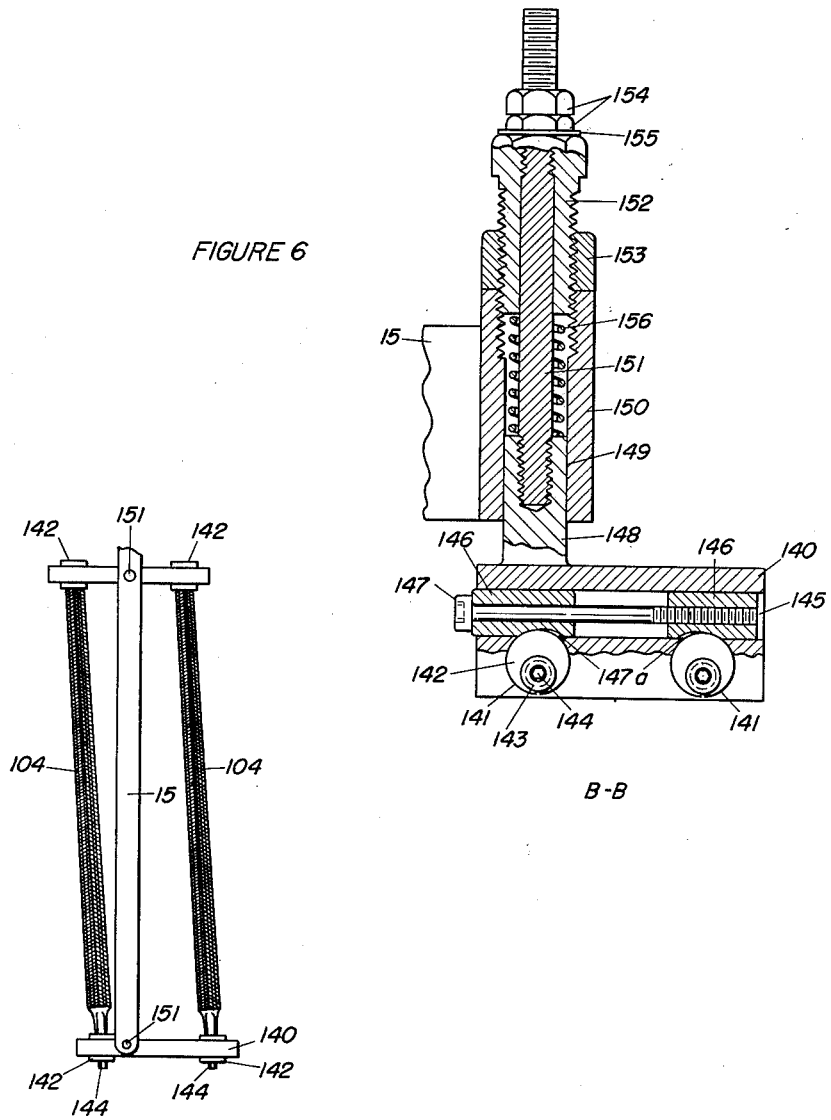

Oct. 13, 1953 — H. E. HULL — 2,655,057
SAW FILING MACHINE
Filed Sept. 15, 1949 — 8 Sheets-Sheet 8

INVENTOR.
Henry E. Hull
BY Adams, Stevens and Mase
AGENTS.

Patented Oct. 13, 1953

2,655,057

UNITED STATES PATENT OFFICE 2,655,057

SAW FILING MACHINE

Henry E. Hull, Worthington, Ohio, assignor, by mesne assignments, to Rockwell Tools, Inc., Columbus, Ohio, a corporation of Ohio Application September 15, 1949, Serial No. 115,876

7 Claims. (Cl. 76—35)

This invention relates to saw machines. In particular, this invention relates to saw filing machines for circular saw blades, and, specifically, those circular saws which have a deep gullet between groups of cutting teeth.

It is an object of this invention to provide an automatic saw filing machine.

It is also an object of this invention to provide means for adjusting the working angle and pressure of the file against the saw teeth.

It is another object of this invention to provide an automatic saw filing and indexing machine for circular saw blades having a deep gullet between groups of cutting teeth rather than the relatively small gullet between individual teeth.

It is still another object of this invention to provide a machine wherein a preselected tooth or teeth are automatically brought into position for filing and then simultaneously filed by one or more files.

It is yet another object of this invention to provide in a saw filing machine an arrangement of elements whereby the saw blade can be placed in the adjusted machine in any operating position without the necessity of careful manual positioning or tooth location.

It is a further object of this invention to provide in a saw filing machine means for automatically stopping the operation of the filing mechanism after the desired tooth or teeth of a given number of groups have been filed.

It is a still further object of this invention to provide in a saw filing machine means for rapidly loading and unloading the machine with a saw blade and means for holding the blade under restraint while it is being filed.

It is again an object of this invention to provide an automatic circular saw blade indexing mechanism for saw filing machines.

It is yet again an object of this invention to provide an automatic saw filing and indexing machine capable of accommodating saw blades of various diameters and thickness.

These and other objects and advantages of the present invention not specifically set forth will become more apparent when taken in conjunction with the following detailed description and drawings in which:

Figure 1 is a side elevational view of the assembled saw filing machine,

Figure 2 is a front elevational view of the saw filing machine with the motor and drive mechanism removed, Figure 3 is a detail of the counter resetting mechanism showing the reset pawl, lifter ring and gear, Figure 4 is a vertical cross-sectional view along the line A—A of the device shown in Figure 3, Figure 5 is a side elevational, partly cross-sectional view showing the pawl carrying lever, Figure 6 is a view, partly in vertical elevation and partly in vertical cross section, along the line B—B of Figure 1 showing the arrangement of parts in the front file holder assembly for adjusting the angle and pressure of the file against the saw teeth, Figure 7 is a side elevational view, partly in vertical cross section, of the saw blade pivot pin assembly, Figure 8 is a rear view of a portion of the device shown in Figure 7 showing how the socket clamp plate is secured to the casting, Figure 9 is a vertical cross-sectional view along the line C—C of Figure 2, Figure 10 is a vertical side-elevational view of the cam and Scotch yoke mechanism for actuating the file holder and index rocker arm, a portion of the parts being shown in full lines, Figure 11 is a top-plan view, partly sectional, of the toggle yoke assembly, Figure 12 is a wiring diagram, Figure 13 is a schematic representation of the action of the files on the cutting edges or surfaces of saw teeth Numbers I, III, and V of a representative circular saw blade, Figure 14, a and b, is a schematic top-plan view of a blade showing the direction of the file operating on the teeth.

Figure 17 is a schematic top plan view of the arrangement of the file holders relative to the carrier.

Figure 1:
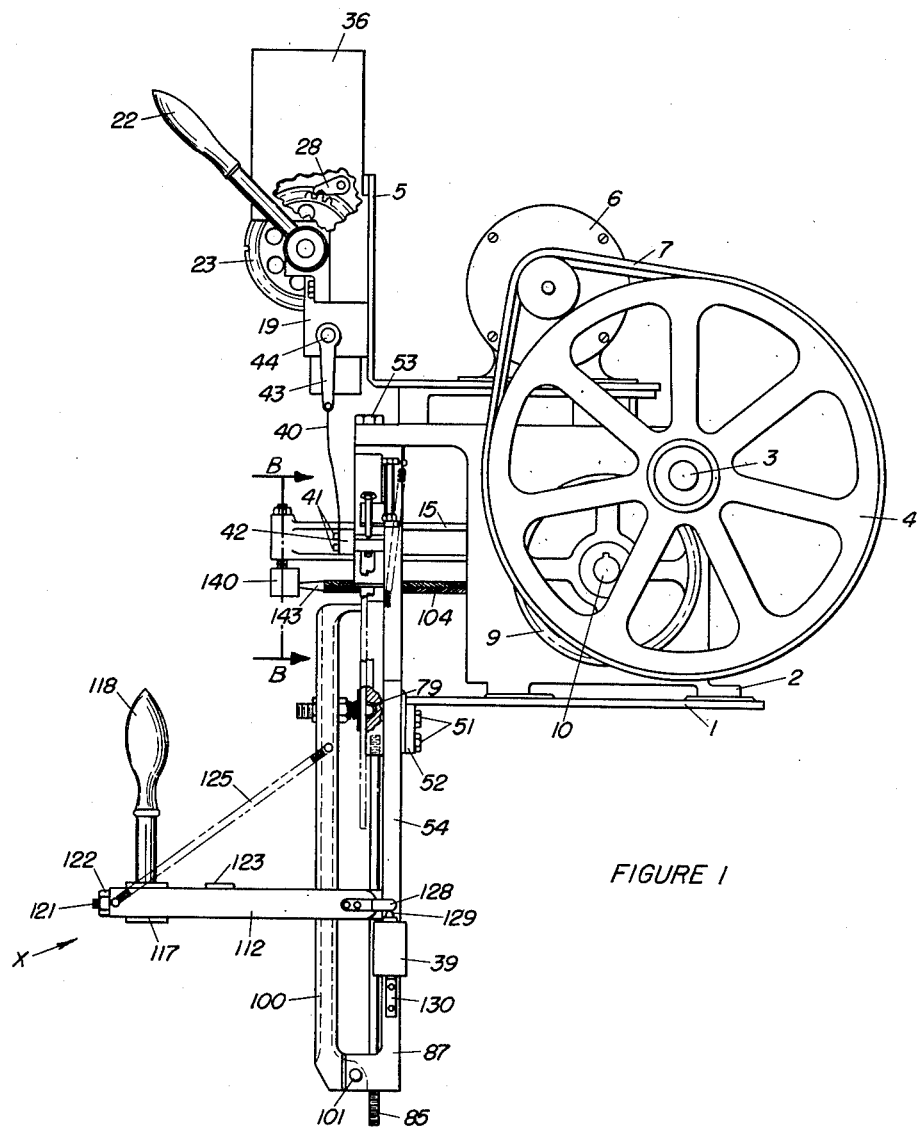

The various elements of the saw filing machine and their mode of operation will now be described in greater detail.

With reference to the drawings, Figures 1 to 17, inclusive, 1 is the base plate to which is pivotably adjustably secured frame 2 carrying shaft 3, which passes through the frame and on which is mounted pulley 4. L-shaped member 5 on the frame supports motor 6 driving pulley 4 through V-belt 7. On shaft 3 between the pulley and the frame is pinion 8 meshing with gear 9 keyed to shaft 10 turning in a bearing in the frame to operate crank 11 and cam 12, by which Scotch yoke 13 and cam follower 14 cycle file carrier 15 and vertically reciprocate lifter 16 to cause saw blade index rocker arm 17 to pivot on pin 18. The action of file carrier 15 is not strictly rotary but consists of four substantially sequential straight line motions due to the action of the crank, Scotch yoke, cam and cam follower. With the filing stroke as the first motion, carrier 15 moves horizontally back towards the frame. At the end of this stroke it is vertically raised along with lifter 16, next it is carried forward away from the frame above the work, and finally it is lowered to filing position at the time lifter 16 is lowered.

On front of member 5 is the counting and resetting mechanism. Above predetermining counter 19, of a type as manufactured by Veeder Root, Inc., Hartford, Conn., shaft 20 rotates in bearings 21—21, and to one end of which is secured counter reset handle 22. On the shaft, free-running resetting gear 23 meshes with pinion 24, the ratio between the gear and pinion being 4 to 1, secured or keyed to counter reset shaft 25 extending from the casing of the predetermining counter. On the side of the resetting gear is pawl lifter ring 26 having "V-shaped" notches 27—27 at ninety degree intervals on the periphery of the ring. Pawl 28 on pivot 29 of lever 30 secured to the shaft is adapted to bear against the teeth of resetting gear 23. Cam 31, on the side of the pawl rides on the surface of the pawl lifter ring and drops into the notches causing engagement of the pawl with a tooth of the resetting gear. Bolt 33 secured to and projecting through lug 34 on lever 30 serves as a stop to limit the movement of the shaft and gear assembly by bearing against the face of L-shaped member 5 when the lever is rotated ninety degrees, and thereby prevents the counting mechanism from over-running. Helical spring 35 having one end attached to the shaft and the other to bearing 21 serves to retract the lever and handle assembly after the resetting gear has turned through its ninety degree arc. Box 36 houses the magnetic switch for the motor, and snap switch 37, connected to a suitable source of electric current, controls the current thereto and to single pole switch 38 in the predetermining counter and to single pole limit switch 39. It is, thus, seen that when handle 22 is pulled forward and down, shaft 20 rotates lever 30 carrying pawl 28 which is in engagement with the teeth of resetting gear 23 which also rotates ninety degrees and turns pinion 24 a full three hundred sixty degrees thereby resetting the predetermining counter. When the counter is, thus, reset by having all the digits or numbers turned to zero, the mechanism in the counter will close switch 38 therein. On release of pressure on the handle, the spring rotates the shaft in the opposite direction, returning lever 30 and pawl 28 to their original vertical position, as cam 31 disengages pawl 28 from a tooth of gear 23 by means of ring 26. The pawl thus, passes freely over the gear teeth until it reaches the next V-shaped notch 27 in ring 26 into which cam 31 falls permitting the pawl to engage another tooth of gear 23 so that the counter can be again reset when the handle is pulled.

Leaf 40 secured by bolts 41—41 to lug 42 attached to file carrier 15 bears against L-shaped arms 43 adjustably secured to counting shaft 44. The L-shaped arm is set at an angle so that the leaf will actuate it and the counting mechanism of the counter at about the beginning of each filing stroke of the file carrier until the previously set number in the counter, for example, fourteen, corresponding to the number of saw teeth groups 45, has been reached when the contacts disengage causing switch 38 to open, de-energizing the circuit and stopping the machine at a position that will permit an indexing stroke to occur prior to the next filing stroke. At this stopping position, obtained by setting the arm 43 at an angle, the carrier and its working member have been lifted sufficiently for work removal, but the lifter has not initiated indexing by contacting the rocker arm, allowing manual work loading in any circumferential position. Thus, although the current will have been shut off at the beginning of the 14th stroke, the momentum of the machine will cause the file carrier to complete its filing stroke but the machine will completely stop moving prior to beginning any indexing action.

Attached by bolts 51—51 to depending lug 52 of base plate 1 and also by bolt 53 to frame 2, providing pivotable connection, is vertical casting 54, having a generally oval opening in the upper portion thereof, through which passes the oscillating saw file and on which is mounted the saw blade indexing and clamping mechanism indicated generally by $x$ and $y$, respectively.

The arrangement of parts of the indexing mechanism will now be described with greater particularity. Index rocker arm 17 which rocks on pivot 18 secured in boss 55 of casting 54 due to the action of lifter 16 is connected by pin 56 to rocker arm extension 57 pivotably attached by pin 58 to blade index push rod 59. Pin 60 placed in one of the series of holes 61—61 secures the push rod to blade index pawl arm 62 pivotably mounted on saw blade socket plate 63. Holes 61—61, thus, provide means to adjust the operating angle of the pawl arm travel to allow for saw blades having different diameters and numbers of saw teeth groups. Screws 64—64 riding in slot 65 of the blade index pawl arm adjustably hold index pawl holder 66 which carries pawl 67 secured to the holder by set screw 68. Pawl 67 has an inclined face whose outwardly extending end is designed to enter deep gullet 69 in circular saw blade 70 and bear against the edge of the blade. The pawl holder can, thus, be placed in any position in the slot to accommodate blades of various diameters. Stop screw 71 mounted in ear 72 of the casting provides means to limit or adjust the rocking action of the rocker arm. Likewise, adjustment screw 73 in foot 74 of the rocker arm is designed to be turned down against extension 57 to permit similar adjustment between the rocker arm and the extension. By means of these stops the travel of the push rod may be regulated so that the pawl moves the saw blade each time to place the correct tooth, that is Number I, or II, or III, etc., or groups of teeth, in filing position. One end of retracting spring 75 is connected to bolt 76 mounted in ear 77 on the casting and other end is connected to lug 78 on the pawl arm by which the proper pressure is maintained between the blade index pawl arm and the casting.

At the end of the filing cycle, file carrier 15 is elevated along with lifter 16 which strikes rocker arm 17 causing it to rock on pivot 18 in boss 55. The motion is, thus, transmitted through extension 57 and push rod 59 to pawl arm 62 which rotates on the bearing of socket plate 63 causing pawl 67, extending axially into relatively deep gullet 69 of blade 70 to move the blade clockwise through an arc and position one or more of the teeth for filing action. After the file carrier has moved forward and has started downward and the lifter has started downward so that the lifter is no longer applying pressure to the rocker arm, spring 75 comes into play to force the inwardly extending end of the inclined face of pawl 67 against the blade 70, springing the edge of the blade 70 away from the pawl holder 66 so as to withdraw the pawl from the deep gullet between the groups of teeth and retract the indexing mechanism to enable the pawl to enter the next gullet in order to be properly positioned for indexing the saw blade again at the end of the next filing stroke.

The saw blade socket plate 63 on which the pawl arm pivots has a mandrel or socket hole 79 for reception of the mandrel or pivot 80 and a threaded shaft 81 which passes parallel with a long, narrow vertical slot 82 in the casting and which carries washer 83 and nut 84 to secure the plate to the casting. Rod 85 supporting the depending portion 86 of the plate has its lower end threaded through foot 87 of the casting. These securing and supporting elements provide means for vertically adjusting the socket plate and its co-operating elements to enable use with the machine of saw blades of different diameters. Bolt 88, passing through vertical slot 82 and washer 89, adjustably secures saw blade back-up block 90 to the casting above the socket plate. The back-up block prevents the saw blade and teeth from excessive flexing on the filing stroke.

The clamping mechanism is of the toggle clamp type and provides means for quickly loading and unloading the saw filing machine. In the clamping mechanism I-beam 100 pivots on pin 101 in foot 87 of the casting and has finger 102 on the free end of the beam which serves to firmly press the edge of the saw blade below teeth 103 and gullet 69 against back-up block 90 on the casting to prevent free movement, or to provide restrained movement, by the blade when the files 104—104 are filing the teeth.

Slot 105 in the I-beam provides means for vertically adjusting the position of the mandrel assembly to accommodate blades of different diameters. In the mandrel assembly, shaft 106, having cotter pin 107 on one end to limit its movement and on the other end flange 108 which bears against a portion of saw blade 70 adjacent its mandrel hole, supports the blade on mandrel or pivot 80. The shaft passes through sleeve 109 in the slot of the beam and secured thereto by means of nuts 110—110. Spring 111 between the sleeve and flange provides the necessary force to hold the blade on the mandrel firmly against socket plate 63.

Below the mandrel assembly I-beam 100 passes between the parallel toggle clamp bars 112—112 of the yoke assembly and is secured to hinge 113 pivotably connected by pin 114 to clamp link 115 held by pin 116 to H-shaped adjusting block 117 carrying yoke handle 118 and riding on the links as a guideway. The bars are held in spaced relationship by toggle yoke block 119 having threaded hole 120 through which passes screw 121 carrying lock nut 122 and by means of which the position of the adjusting block and link can be varied and fixed so that the clamp will accommodate saw blades of different thicknesses, and provide the necessary restraint to turning of the blade. Plate 123 is secured to the link by machine screws 124—124 and normally rides on the upper surface of the bars and limits the downward movement of the link on closing due to the pressure of the springs 125—125 between the parallel bars and I-beam. Pin 126 secures the ends of the bars near the I-beam to pivot block 127 fastened to casting 54. L-shaped lug 128 is attached to the side of one bar, and when the toggle clamp is closed, it is designed to depress button 129 closing the circuit of limit switch 39 mounted on bracket 130 attached to the casting.

To open the toggle clamp, the operator presses or pulls down on yoke handle 118 causing parallel toggle clamp bars to pivot on pin 126 and clamp link 115 to raise and pull back on I-beam 100 which pivots on pin 101 in foot 87 of casting 54, while lug 128 on the side bar 112 leaves button 129 of limit switch 39 thereby opening the switch and preventing operation of the filing and indexing mechanism when the clamp is open. When it is desired to close the toggle clamp mechanism, the operator lifts the handle, and spring 125 between the I-beam and the parallel bars retracts, pulling the I-beam and parallel bars together and thereby causing the reverse of the above action to take place.

Figure 6 shows the structure of the adjustable front file holder assembly. Rectangularly shaped block 140 which is constructed with an offset, i. e., of about ½-inch, toward the radial face of the saw blade teeth to obtain the cant angle has one or more holes 141—141 therein containing crescent shaped clamp rings 142—142 in which are inserted round sleeves 143—143 which accommodate file ends 144—144 of triangularly shaped files 104—104 (although any shaped file can be used which is suitable for filing the teeth of circular saw blades), and also has cylindrical opening 145 for the reception of sleeves 146—146, one tapped and one bored, drawn together by screw 147 whereby notches 147a—147a of the sleeves are pressed against the rings and adjustably securely hold the ends of the files in the holder so that the files will produce the desired rake angle when filing. On the block is boss 148 which fits in bearing hold 149 of holder 150 of file carrier 15 and holds shaft 151 which passes through sleeve 152 threaded to the holder and secured by nut 153 and which carries nuts 154—154 and washer 155 on its threaded end to press against the top surface of the sleeve. Coil spring 156 surrounding the shaft exerts pressure between the sleeve and the boss, and its length is adjusted by turning the sleeve and/or nuts, thereby enabling the operator to readily obtain the desired pressure to be applied by the files against the teeth.

Figure 14:
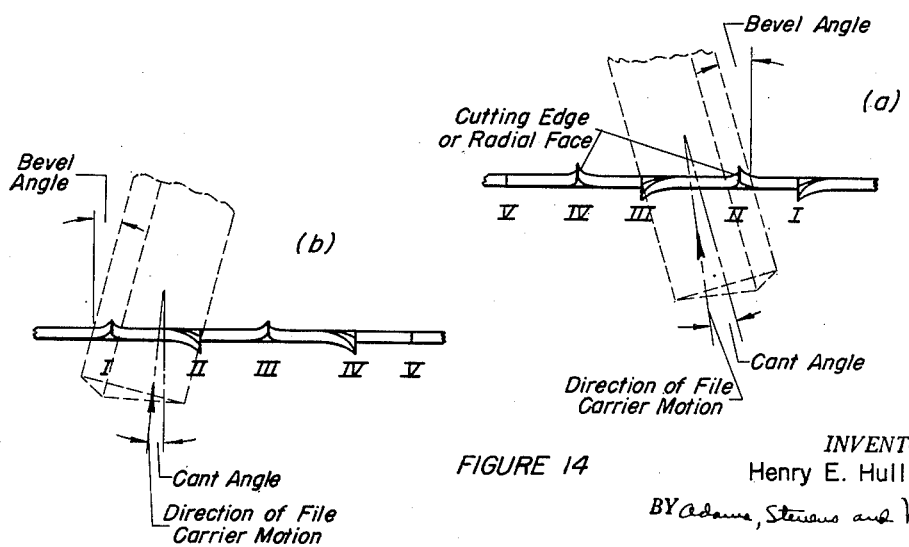

The rear file holder assembly is identical to that of the front file holder assembly except that its block is of symmetrical design, i. e., boss 148 is in the center of rectangularly shaped block 140, see Figure 17. Placing a file in the holders where one has an offset and the other is symmetrical, results in a canting of the file axis from the axis of movement of the file carrier and the attainment of horizontal pressure against the radial face of the teeth. Although the file carrier also reciprocates at a conventional adjustable angle to the plane of the saw blade, since frame 2, carrying file carrier 15 can pivot in horizontal plane on base 1, the file axis is at a slight angle to this movement which enables the file to properly press or work against the cutting edges or radial faces of the saw teeth on the filing stroke (Fig. 14). The bevel angle is the angle between the file axis and a line perpendicular to the plane of the saw blade.

Figure 13:
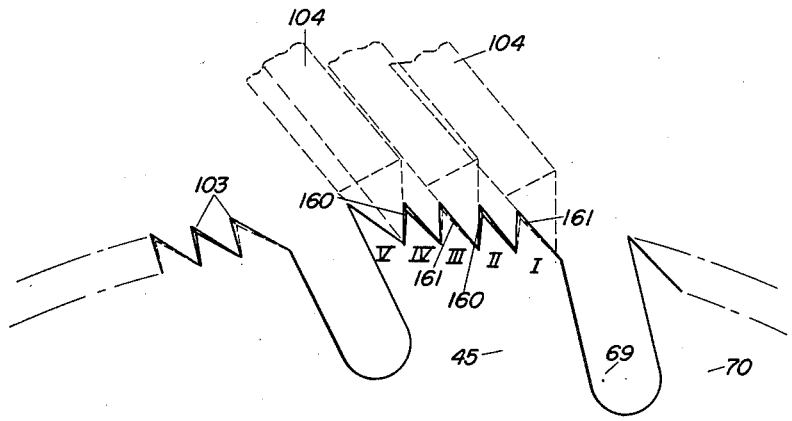

In Figures 2, 7, and 13 to 16, it is seen that the vertically reciprocating lifter 16 causes saw blade index rocker arm 17 through its linkage to move pawl 67 in gullet 69 of saw blade 70 when file carrier 15 is elevated and begins its return motion preparatory to beginning a new filing stroke. The radial face, or cutting edge of those teeth will be filed which have been set in the direction in which the file travels on its cutting stroke (Figure 14a or b) since the file will have less tendency to chatter when it bears against the radial face of teeth which have been set in the direction of the file's motion. The saw blade having its teeth previously set, thus, is rotated in a clockwise manner on the mandrel and saw teeth Numbers II and/or IV, of each group of saw teeth will have their cutting edges or faces 160—160 filed by the action of the file or files on its filing stroke while top surfaces 161—161 of the adjoining teeth will be finished. This method of filing teeth is shown in Figure 13, as applied, for example, to an 8-inch combination saw blade having fourteen groups of teeth where each group has four cutting teeth set alternately in different directions and a raker tooth. While generally, it is desirable to file only the cutting edge or face of one tooth at a time, i. e., of saw tooth Number II of each group, the file holder has provision for two files so that the cutting edges of teeth Numbers II and IV will be finished as described previously. It is, also, possible to use a holder for three files, or maybe more, as in the case of saws with more cutting teeth per group, so that in each group, for example, as shown in Figure 13, three files will operate on the back surface of the raker tooth V and the cutting edge of tooth IV, the back surface of tooth III and the cutting edge of tooth II, and the back surface of tooth I.

Figure 2:
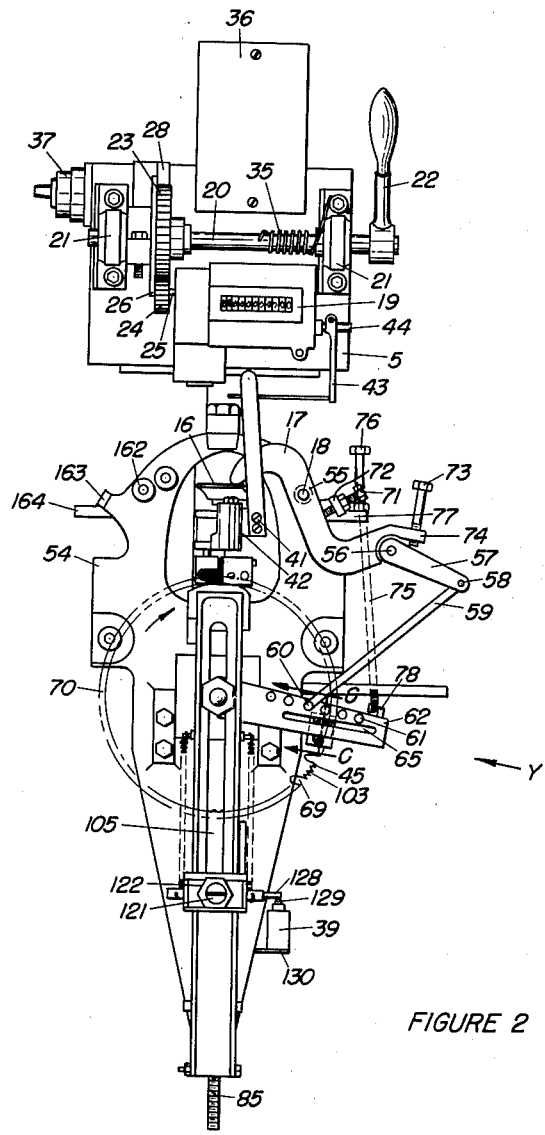
Figure 5:
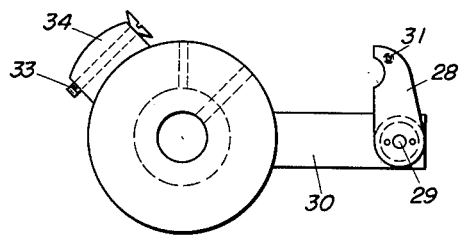
Figure 3:
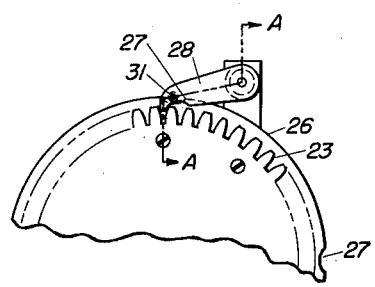
Figure 4:
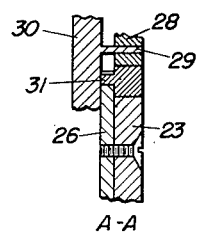
Figure 7:
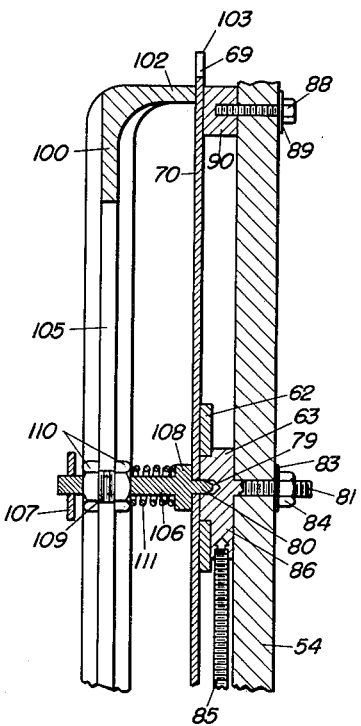
Figure 8:
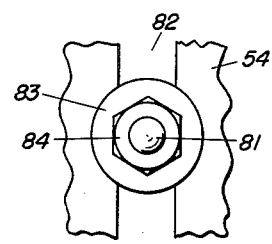
Figure 10:
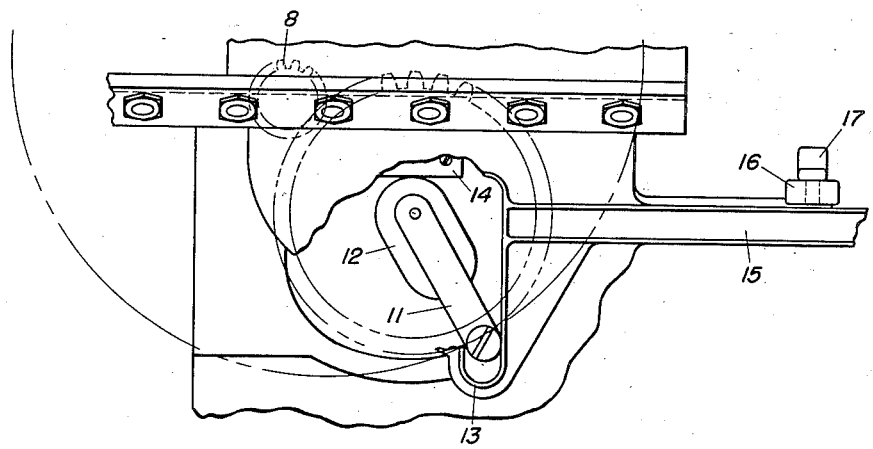
Figure 9:
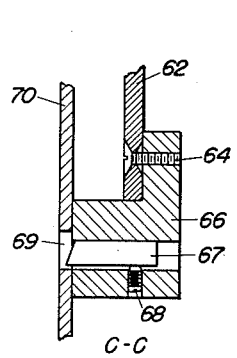
Figure 16:
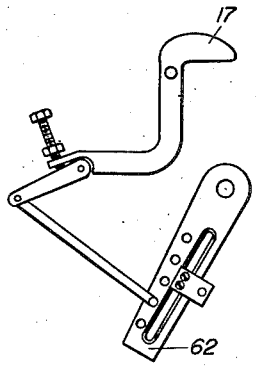
Figure 16 is a view of the indexing mechanism for mounting on the left hand side of the casting when the saw blade moves counterclockwise.
Figure 11:
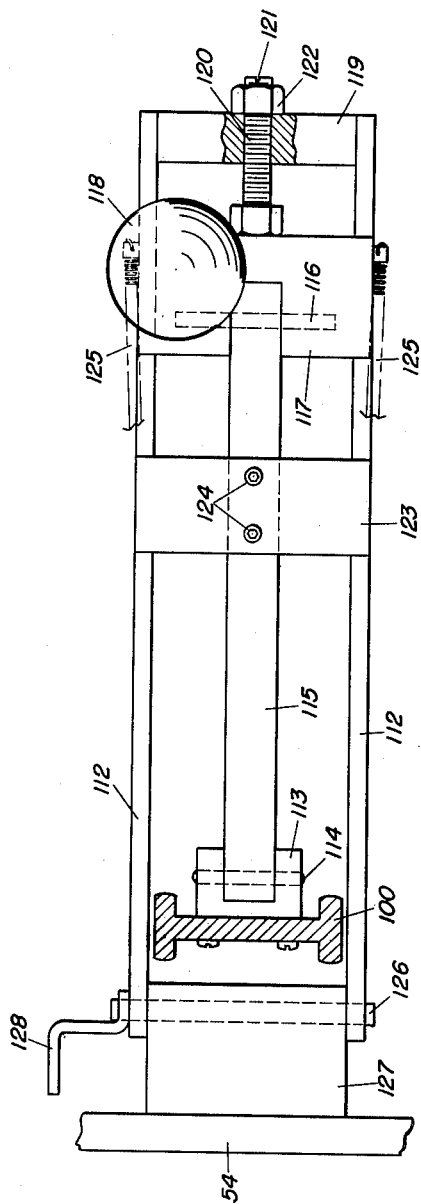
Figure 12:
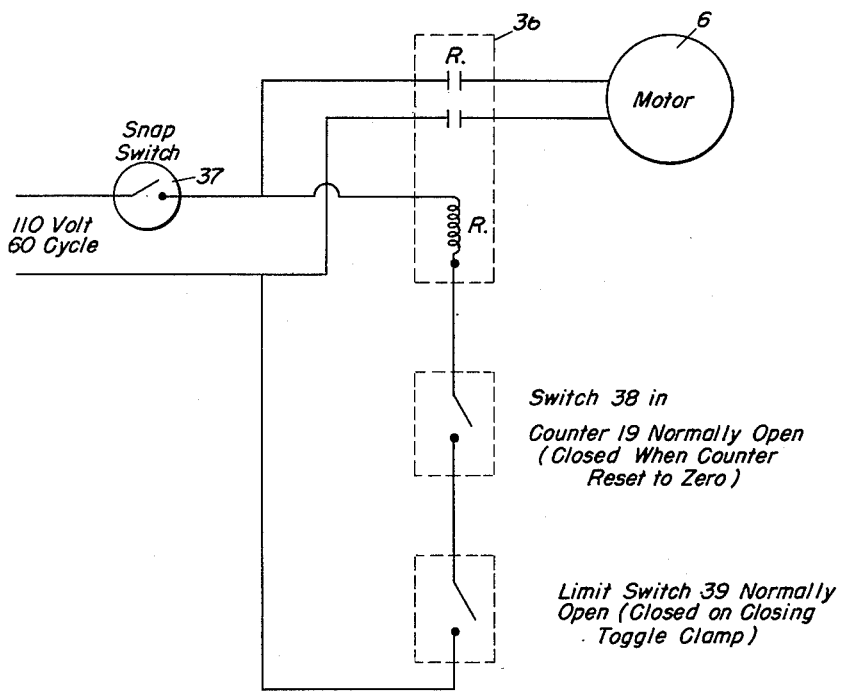

Since only teeth Numbers II and IV, Figures 13 and 14a, set in the direction toward the machine or in the direction of the file on the filing stroke, will be filed with the indexing mechanism assembled on the right hand side of casting 54, Figure 2, it is necessary in order to file the other teeth to remove the files, turn the front file holder around and replace the files; to reassemble the indexing mechanism of the machine in Figure 2 on the left hand side of the casting, as shown in Figure 16, or to use another machine; and to turn the saw blade over in order to rotate the saw blade in a counterclock-wise fashion, enabling the cutting edges of teeth Numbers I and/or III to be finished. Since casting 54 and the socket plate are symmetrical, this is readily accomplished, for it is only necessary to remove the indexing mechanism and related parts and reassemble and mount them in boss 162, and ears 163 and 164 on the front left hand side of the casting corresponding to boss 55 and ears 72 and 77 on the front right hand side of the casting, placing the pawl arm and holder in the position on the left side corresponding to that shown for the right side, Figure 16. The saw blade is then turned over and will be in position to have teeth Numbers I and/or III filed when the block 140 is turned around by loosening nut 153 and nuts 154—154 and the files replaced.

Figure 15:
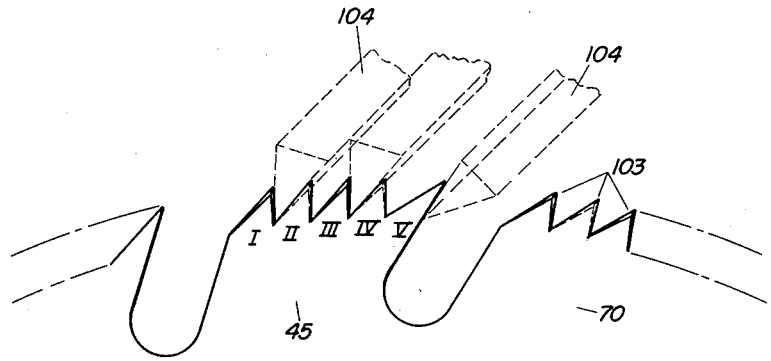
Figure 15 is a schematic representation of the action of the files in filing the cutting edges or surfaces of teeth Numbers II, IV, and V of the blade shown in Figure 13.

It is, of course, obvious that the arrangement of driving elements and parts of the machine can be reversed so that the saw will file on the forward or outward stroke, and using the indexing mechanism assembled on the casting as shown in Figure 2 with the saw blade in position, with readjustment of the filing angle of the files, shown in 14b, teeth Numbers I and/or III would have their cutting edges or faces finished, Figure 15, while the back surfaces of saw blade teeth Numbers II and/or IV would be finished as well as the face of the raker tooth V (where three saw files are employed). The raker tooth can, of course, be finished in a separate operation. Although the raker tooth has no cutting edge as such, it is generally finished on its front and back surfaces, or smoothed, to free it of tool marks, burrs, flash, etc., which might pick up too much sawdust and prevent the attainment of a smooth cut.

When operating the saw filing machine, the operator adapts the mandrel or pivot and pivot socket plate to receive the diameter and thickness of saw blade that is going to be used. Then he places files in the file holders and adjusts the indexing mechanism so that, for example, teeth II and IV of the saw blade will be filed. The next operation is to set the predetermining counter to fourteen where there are fourteen groups of teeth and to turn the counting mechanism back to zero to close the switch in the counter. The toggle clamp is opened, a saw blade having fourteen groups is placed on the mandrel, the line switch closed, and the toggle clamp closed. The machine then automatically starts indexing and filing, at the end of each filing stroke the indexing mechanism rotating the blade to bring another group into position. After fourteen strokes the counter switch will break the circuit, and indexing and filing operations will cease; the toggle clamp will be opened and the saw blade removed. The operator then resets the counter, places a new blade on the mandrel and closes the toggle clamp to start a new sequence of operations.

In production runs it will be desirable to have one person operate two or more machines rather than file all of the teeth of the saw blade by using only one machine due to the extra labor involved in disassembly and reassembly of the indexing and file holder mechanism. For example, as soon as the first saw-filing machine has filed teeth Numbers II and IV of each group of teeth of the saw blade, the toggle clamp is opened, and the blade is removed, turned over and placed in a second machine which will now file teeth Numbers I and III of each group, and a third machine can file the raker tooth. Various combinations can be made and the raker tooth can be filed with tooth III and/or tooth IV, etc.

The machine shown here is not limited to use with only 8-inch saw blades but can be utilized with saw blades of varying diameters as well as thicknesses. It is, also, not limited to blades having only fourteen groups of cutting teeth but can be used with blades having a greater or lesser number of groups, for example, a 6-inch blade having twelve groups, as well as those blades which have more or less than four cutting teeth per group and which may or may not have a raker tooth. It can also be used with blades which do not have groups of teeth, i. e., cut off and rip saws, by adapting the pawl to operate in the gullets between individual teeth, although with such blades the teeth must be carefully positioned.

It is, thus, seen that the new and novel machine shown and described supra and in the drawings renders the saw tooth filing operation for circular saw blades a completely automatic and mechanical one. This machine will automatically and successfully index the desired amount so that the file or files will always engage the proper tooth or teeth. It also provides novel clamping and holding mechanism for the saw blade in combination with means to prevent the actuation of the machine when the clamp is open, thus preventing injury to the worker. The machine also provides novel counting and stopping means, in combination with an arrangement of elements to reset the machine for a new filing operation, and file holders for adjusting the pressure of the file and the angle of filing.

Naturally, the arrangement of elements, parts and members of the machine can be replaced by some other mechanical or electrical means capable of operating or cooperating in the same way as illustrated herein without altering the essential features of the invention.

What is claimed is:

1. In a circular saw blade filing machine, at least one file yieldingly and adjustably secured in file holders, a generally reciprocating file carrier for said holders, a pivotable clamp mechanism for yieldingly holding a circular saw blade in working relationship with said file, an indexer for rotating said blade to bring successive preselected teeth thereof into registry with said file on each reciprocation thereof, a striking member on said carrier, and means actuated through said members each time said file carrier cycles whereby the movement of the file carrier and indexer is stopped after a predetermined number of cycles of said carrier have been completed and number of saw teeth have been filed.

2. In a machine for filing circular saw blades with deep gullets between groups of teeth and having generally reciprocating filing and indexing means moved by a crank, Scotch yoke, cam and cam follower, the combination of, a counter containing counting mechanism and a switch actuated through a striking member on said filing means, and retractable resetting means for movement through an arc to reset said counting mechanism of and close said switch in said counter.

3. In a machine for filing circular saw blades with deep gullets between groups of cutting teeth and having indexing means for rotating a saw blade to bring successive preselected teeth of said blade into registry with a file, the combination of, an oscillating file carrier working in conjunction with said indexng means, and file holders connected to said carrier containing means to adjust the angle and the pressure of the files against the saw teeth one of said file holders being supported with an offset toward the radial face of the saw blade to obtain the cant angle, and the other of said file holders being of symmetrical design about its support.

4. An apparatus for filing the teeth of circular saw blades having a deep gullet between groups of cutting teeth, comprising a base, a file carrier having holders for yieldingly holding at least one file, an indexer for step-by-step rotation of a circular saw blade to bring preselected teeth of said blade into registry with at least one file, means to actuate said carrier and said indexer, and adjustable restraining means for said blade while it is rotated by said indexer and acted on by said file including a pivotable clamp member on said base carrying an adjustable mandrel for holding a saw blade and an adjustable toggle mechanism having a handle and pivotally connected to said base and said clamp member whereby movement of said handle to or from said base quickly releases or secures said blade.

5. In a machine for filing circular saw blades with deep gullets between groups of cutting teeth and having indexing means including a pivotable arm having means to adjust its operating travel angle and carrying a pawl for axial insertion in a gullet between teeth and for circumferential movement of said blade to bring successive preselected teeth of said blade into registry with a file on each oscillation thereof, the combination of, an oscillating file carrier working in conjunction with said indexing means, and file holders connected to said carrier containing means to adjust the height and pressure of the files against the saw blade teeth and containing means to simultaneously adjustably secure a plurality of file ends therein, and to also independently adjust the height, spacing and angle of the file, one of said file holders being constructed with an offset toward the radial face of the saw blade to obtain the cant angle and the other of said file holders being of symmetrical design.

6. An apparatus for filing the teeth of circular saw blades having a deep gullet between groups of cutting teeth, comprising a base, a file carrier having holders for yieldingly holding at least one file, an indexer including a pivotable arm having means for adjusting its travel angle and having its axis the same as said blade and an adjustable pawl carried by said arm for axially entering the gullet between saw teeth and causing circumferential step-by-step rotation of a circular saw blade to bring preselected teeth of said blade into registry with at least one file, means to actuate said carrier and said indexer, and adjustable restraining means for said blade while it is rotated by said indexer and acted on by said file including a pivotable clamp member on said base carrying an adjustable mandrel for holding a saw blade and an adjustable toggle mechanism having a handle and pivotably connected to said base and said clamp member whereby movement of said handle to or from said base quickly releases or secures said blade.

7. In a circular saw blade filing machine, the combination of, at least one file yieldingly and adjustably secured in file holders, a generally reciprocating file carrier for said holders, a pivotable clamp mechanism for yieldingly holding a circular saw blade in working relationship with said file, an indexer including a pivotable arm having means to adjust its operating travel angle and carrying a pawl for axial insertion in the gullet between teeth and for circumferential movement of said blade to bring successive preselected teeth of said blade into registry with said file on each reciprocation thereof, a striking member carried by said carrier for general reciprocation therewith, and means actuated through said member each time said file carrier cycles whereby the movement of the file carrier and indexer is stopped after a predetermined number of cycles of said carrier have been completed and number of saw teeth have been filed.

HENRY E. HULL.

References Cited in the file of this patent

UNITED STATES PATENTS

| Number | Name | Date |
|---|---|---|
| 90,207 | Thompson | May 18, 1869 |
| 534,419 | Bauer | Feb. 19, 1895 |
| 579,103 | Ballew | Mar. 16, 1897 |
| 579,837 | Parsons | Mar. 30, 1897 |
| 610,980 | Wallace et al. | Sept. 20, 1898 |
| 679,748 | Hillstrom | Aug. 6, 1901 |
| 889,180 | Daniels | May 26, 1908 |
| 1,040,905 | Dow | Oct. 8, 1912 |
| 1,159,597 | Meyer | Nov. 9, 1915 |
| 1,281,512 | Carothers | Oct. 15, 1918 |
| 1,379,252 | Diegel | May 24, 1921 |
| 1,668,361 | Foley | May 1, 1928 |
| 2,267,553 | Dale | Dec. 23, 1941 |
| 2,343,171 | Collier | Feb. 29, 1944 |
| 2,432,420 | Hendrickson | Dec. 9, 1947 |